United States Patent
Tenny et al.

(10) Patent No.: US 10,448,289 B2
(45) Date of Patent: Oct. 15, 2019

(54) SYSTEM AND METHOD FOR HANDOVERS IN A DUAL CONNECTIVITY COMMUNICATIONS SYSTEM

(71) Applicant: Futurewei Technologies, Inc., Plano, TX (US)

(72) Inventors: Nathan Edward Tenny, Poway, CA (US); Xuelong Wang, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 118 days.

(21) Appl. No.: 15/655,994

(22) Filed: Jul. 21, 2017

(65) Prior Publication Data
US 2018/0324651 A1 Nov. 8, 2018

Related U.S. Application Data

(60) Provisional application No. 62/501,858, filed on May 5, 2017.

(51) Int. Cl.
*H04W 36/00* (2009.01)
*H04L 29/06* (2006.01)
*H04W 12/04* (2009.01)

(52) U.S. Cl.
CPC ..... *H04W 36/0027* (2013.01); *H04L 63/0428* (2013.01); *H04W 36/0016* (2013.01); *H04W 36/0033* (2013.01); *H04W 36/0038* (2013.01); *H04W 36/0069* (2018.08); *H04W 12/04* (2013.01)

(58) Field of Classification Search
CPC ......... H04W 36/0027; H04W 36/0016; H04W 36/0033; H04W 36/0069; H04W 12/04;
(Continued)

(56) References Cited

U.S. PATENT DOCUMENTS

2010/0274921 A1 10/2010 Lerzer et al.
2015/0264621 A1 9/2015 Sivanesan et al.
(Continued)

FOREIGN PATENT DOCUMENTS

CN 102714794 A 10/2012
CN 104822169 A 8/2015
(Continued)

OTHER PUBLICATIONS

"3rd Generation Partnership Project; Technical Specification Group Radio Access Network; Evolved Universal Terrestrial Radio Access (E-UTRA); Mobility enhancements in heterogeneous networks (Release 11)," 3GPP TR 36.839, V11.0.0, Technical Report, Sep. 2012, 53 pages.
(Continued)

*Primary Examiner* — Brenda H Pham
(74) *Attorney, Agent, or Firm* — Slater Matsil, LLP

(57) ABSTRACT

A method for operating a first access node in a dual connectivity (DuCo) handover includes receiving an event trigger for a combined event from a user equipment (UE), sending to a second access node, a combined instruction for primary secondary cell (PSCell) addition and a role change with the second access node in accordance with the event trigger, adding as the second access node as a PSCell, and indicating to the UE, a role change between the first access node and the second access node.

8 Claims, 13 Drawing Sheets

(58) Field of Classification Search
CPC . H04W 80/04; H04W 36/18; H04W 36/0011; H04W 36/14; H04W 36/08; H04W 84/12; H04W 88/08; H04W 84/06; H04W 88/06; H04W 84/18; H04W 74/08; H04W 36/30; H04W 36/24; H04W 8/26; H04L 63/0428; H04L 2012/5608; H04B 7/2046; H04B 7/18532; H04B 7/2041; H04B 7/2048
USPC ..... 370/331, 310.2, 323, 328, 338, 332, 349
See application file for complete search history.

(56) References Cited

U.S. PATENT DOCUMENTS

| | | | |
|---|---|---|---|
| 2015/0296414 A1 | 10/2015 | Yi et al. | |
| 2016/0338134 A1* | 11/2016 | Nagasaka | H04W 76/10 |
| 2017/0181044 A1 | 6/2017 | Wen et al. | |

FOREIGN PATENT DOCUMENTS

| | | |
|---|---|---|
| CN | 105517086 A | 4/2016 |
| CN | 105981442 A | 9/2016 |

OTHER PUBLICATIONS

"3rd Generation Partnership Project; Technical Specification Group Radio Access Network; Study on Small Cell enhancements for E-UTRA and E-UTRAN; Higher layer aspects (Release 12)," 3GPP TR 36.842 V12.0.0, Technical Report, Dec. 2012, 71 pages.

Huawei et al., "Throughput results for intra-frequency deployment of small cells," Agenda item 7.2.1, 3GPP TSG-RAN WG2 Meeting #82, R2-131781, Fukuoka, Japan, May 20-24, 2013, 4 pages.

Huawei, et al., "Simulations of intra-frequency user throughput," 3GPP TSG RAN WG2 Meetings #83, Agenda item 7.2.1, R2-132832, Barcelona, Spain, Aug. 19-23, 2013, 5 pages.

* cited by examiner

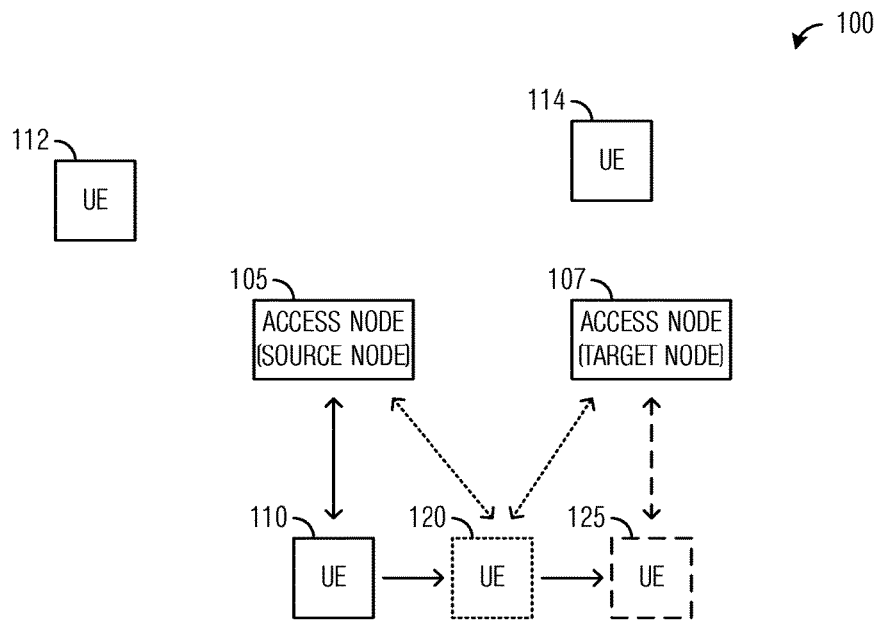
*Fig. 1*
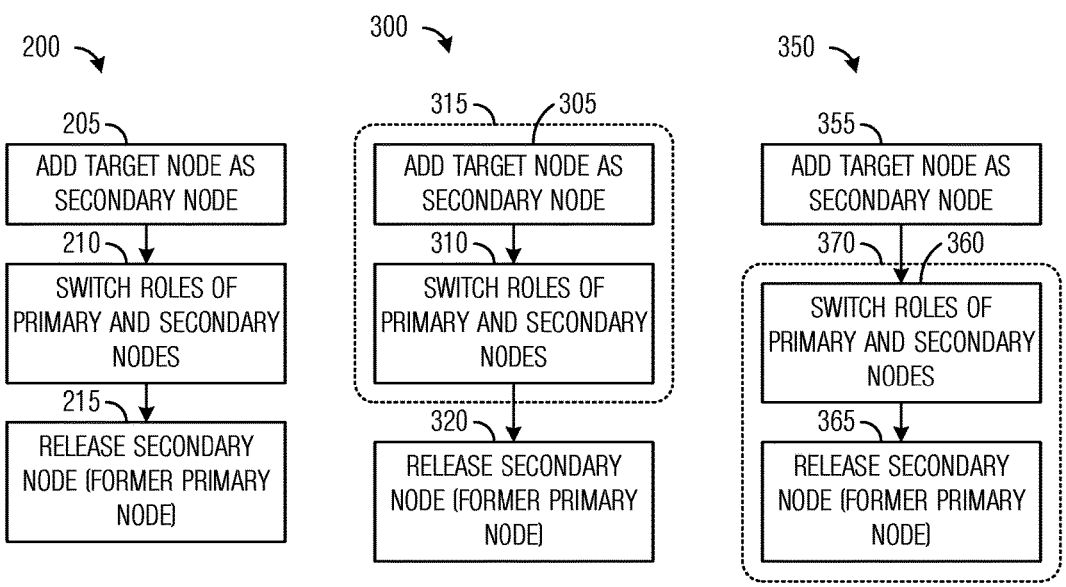
*Fig. 2*   *Fig. 3A*   *Fig. 3B*

SYSTEM AND METHOD FOR HANDOVERS IN A DUAL CONNECTIVITY COMMUNICATIONS SYSTEM

CROSS-REFERENCE TO RELATED APPLICATIONS

This application claims the benefit of U.S. Provisional Application No. 62/501,858, filed on May 5, 2017, entitled "System and Method for Handovers in a Dual Connectivity Communications System," which application is hereby incorporated herein by reference.

TECHNICAL FIELD

The present disclosure relates generally to a system and method for digital communications, and, in particular embodiments, to a system and method for handovers in a dual connectivity (DuCo) communications system.

BACKGROUND

Handovers support device mobility by allowing the device to change connectivity from a first access node to a second access node. A handover typically occurs when the device moves out of service of the first access node into service of the second access node. Without handovers, the quality of the connection between the device and the first access node will deteriorate until the connection is broken.

SUMMARY

Example embodiments provide a system and method for handovers in a dual connectivity (DuCo) communications system.

In accordance with an example embodiment, a method for operating a first access node in a DuCo handover is provided. The method includes receiving, by the first access node, an event trigger for a combined event from a user equipment (UE), sending, by the first access node, to a second access node, a combined instruction for primary secondary cell (PSCell) addition and a role change with the second access node in accordance with the event trigger, adding, by the first access node, the second access node as a PSCell, and indicating, by the first access node, to the UE, a role change between the first access node and the second access node.

Optionally, in any of the preceding embodiments, the method further comprises receiving, by the first access node, a UE context release instruction from the second access node, and releasing, by the first access node, a UE context associated with the UE.

Optionally, in any of the preceding embodiments, the method further comprises forwarding, by the first access node, at least one data packet to the second access node prior to receiving the UE context release instruction.

Optionally, in any of the preceding embodiments, the method further comprises receiving, by the first access node, an acknowledgement for both the PSCell addition and the role change from the second access node.

Optionally, in any of the preceding embodiments, wherein the event trigger reflects a combination of a first quality indicator associated with the first access node falling below a first threshold and a second quality indicator associated with the second access node rising above a second threshold relative to a third quality indicator associated with the first access node.

In accordance with an example embodiment, a method for operating a first access node in a DuCo handover is provided. The method includes receiving, by the first access node, a combined event trigger for a combined event from a UE, sending, by the first access node, to a second access node, a combined instruction for a role change with the second access node and a PSCell release in accordance with the combined event trigger, indicating, by the first access node, to the UE, a role change between the first access node and the second access node, receiving, by the first access node, a UE context release instruction from the second access node, and releasing, by the first access node, a UE context associated with the UE.

Optionally, in any of the preceding embodiments, the method further comprises forwarding, by the first access node, at least one data packet to the second access node prior to receiving the UE context release instruction.

Optionally, in any of the preceding embodiments, the method further comprises receiving, by the first access node, an event trigger for a PSCell addition, and adding, by the first access node, the second access node as a PSCell in accordance with the event trigger.

Optionally, in any of the preceding embodiments, wherein receiving the event trigger and adding the second access node occur prior to receiving the combined event trigger.

Optionally, in any of the preceding embodiments, wherein the combined event trigger reflects a combination of a first quality indicator associated with the first access node falling below a first threshold and a second quality indicator associated with the second access node rising above a second threshold relative to a third quality indicator associated with the first access node.

In accordance with an example embodiment, a method for operating a second access node in a DuCo handover is provided. The method includes receiving, by the second access node, from a first access node, a combined instruction for a role change with the second access node and a PSCell release, changing, by the second access node, to operating as a primary cell (PCell), and sending, by the second access node, a UE context release instruction to the first access node.

Optionally, in any of the preceding embodiments, the method further comprises establishing, by the second access node, a UE context for a UE as a PSCell.

Optionally, in any of the preceding embodiments, the method further comprises operating, by the second access node, as a PSCell prior to sending the UE context release instruction.

In accordance with an example embodiment, a method for processing packets during a role change between a first access node and a second access node is provided. The method includes applying, by a UE, to a first set of packets, a first set of packet data convergence protocol (PDCP) functions associated with the first access node prior to a processing of a switch indicator, wherein the first set of PDCP functions associated with the first access node includes sequence number assignment and header compression, applying, by the UE, to a second set of packets, a first set of PDCP functions associated with the second access node after the processing of the switch indicator, wherein the first set of PDCP functions associated with the second access node includes sequence number assignment and header compression, applying, by the UE, to a third set of packets, a second set of PDCP functions associated with the first access node when communicating with the first access node, wherein the second set of PDCP functions associated with the first access node includes header addition and/or removal and deciphering and/or ciphering, and applying, by the UE, to a fourth set of packets, a second set of PDCP functions associated with the second access node when communicating with the second access node, wherein the second set of PDCP functions associated with the second access node includes header addition and/or removal and deciphering and/or ciphering.

Optionally, in any of the preceding embodiments, wherein the switch indicator is an activation time, and wherein applying the second set of PDCP functions associated with the first access node and applying the second set of PDCP functions associated with the second access node occur both prior to and subsequent to the activation time.

Optionally, in any of the preceding embodiments, wherein the activation time comprises a time when the role change occurs.

Optionally, in any of the preceding embodiments, wherein the first set of packets comprises packets exchanged prior to the activation time, and wherein the third set of packets comprises packets exchanged with the first access node.

Optionally, in any of the preceding embodiments, wherein the second set of packets comprises packets exchanged after the activation time, and wherein the fourth set of packets comprises packets exchanged with the second access node.

Optionally, in any of the preceding embodiments, wherein the switch indicator is a PDCP protocol data unit (PDU) indicating the role change, and wherein applying the second set of PDCP functions associated with the first access node and applying the second set of PDCP functions associated with the second access node occur both prior to and subsequent to the processing of the PDCP PDU.

Optionally, in any of the preceding embodiments, wherein the first set of packets comprises packets exchanged prior to the processing of the PDCP PDU, and wherein the third set of packets comprises packets exchanged with the first access node.

Optionally, in any of the preceding embodiments, wherein the second set of packets comprises packets exchanged after the processing of the PDCP PDU, and wherein the fourth set of packets comprises packets exchanged with the second access node.

Optionally, in any of the preceding embodiments, wherein the PDCP PDU is one of a PDCP control PDU indicating the role change or a PDCP data PDU including an end marker.

Practice of the foregoing embodiments enables an optimization of handovers in a dual connectivity communications system by combining a switching of primary and secondary node roles with either the addition of a target node as a secondary node or the release of the former primary node. The optimization reduces the amount of signaling and number of procedural steps, which helps to improve overall handover performance.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 1 illustrates an example wireless communications system according to example embodiments described herein;

FIG. 2 illustrates a flow diagram of operations occurring in a 3GPP DuCo handover procedure;

FIG. 3A illustrates a flow diagram of example operations occurring in a two-step DuCo handover where the role change is combined with the addition of the PSCell according to example embodiments described herein;

FIG. 3B illustrates a flow diagram of example operations occurring in a two-step DuCo handover where the role change is combined with the PSCell release according to example embodiments described herein;

DETAILED DESCRIPTION OF ILLUSTRATIVE EMBODIMENTS

Figure 4:
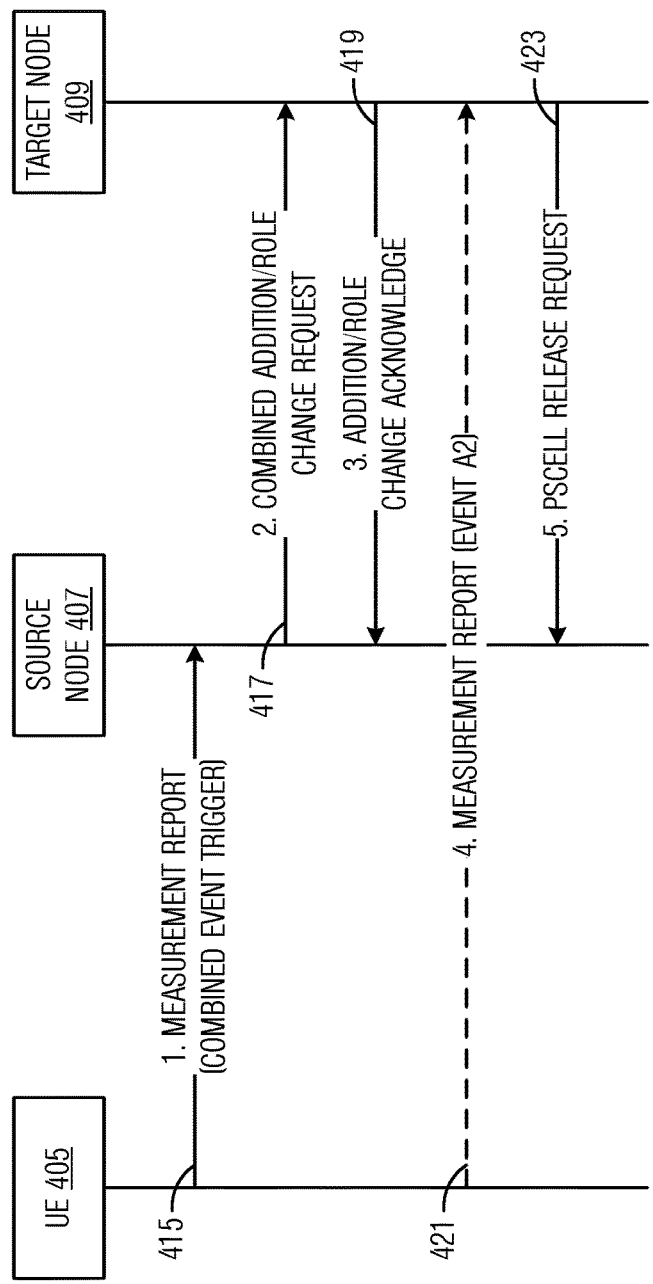
FIG. 4 illustrates a diagram of transmissions occurring at devices in accordance with the first example embodiment described herein.

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

FIG. 1 illustrates an example wireless communications system 100. As shown in FIG. 1, communications system 100 supports dual connectivity (DuCo) operation where a single user equipment (UE) can be connected to two or more access nodes, and simultaneously exchange data with the two or more access nodes. The two or more access nodes may be part of the same network infrastructure or different network infrastructures (as an example, in a two access node situation, a first access node may be part of a legacy macrocell network and a second access node may be part of a managed or unmanaged overlay picocell network).

Communications system 100 includes access nodes, such as access node 105 and access node 107. The access nodes serve a plurality of UEs, such as UE 110, UE 112, and UE 114. While it is understood that communications systems may employ multiple access nodes capable of communicating with a number of UEs, only two access nodes and a number of UEs are illustrated for simplicity. Access nodes are also commonly referred to as NodeBs, evolved NodeBs (eNBs), next generation (NG) NodeBs (gNBs), master eNBs (MeNBs), secondary eNBs (SeNBs), master gNBs (MgNBs), secondary gNBs (SgNBs), base stations, access points, remote radio heads, and so on. Access nodes may be used as a more general term for eNBs, gNBs, NodeBs, MeNBs, SeNBs, MgNBs, SgNBs, base stations, access points, remote radio heads, and so on. Similarly, UEs are also commonly referred to as mobiles, mobile stations, stations, terminals, subscribers, users, and the like.

As shown in FIG. 1, UE 110 is mobile. Initially, UE 110 is connected with access node 105, which is serving as a source node for UE 110. As UE 110 moves about, UE 110 moves into an area where UE 110 is able to connect to both access node 105 and access node 107. When UE 110 is connected to both access node 105 and access node 107, UE 110 is referred to as UE 120 to reduce confusion. As UE 110 continues to move above, UE 110 moves to an area where UE 110 is able to connect to only access node 107. When UE 110 is connected to access node 107, UE 110 is referred to as UE 125 to reduce confusion.

As UE 110 moves about, UE 110 participates in a DuCo handover, which is a technique used to avoid data interruption. UE 110 is initially connected to access node 105, which serves as a primary node for UE 110. As UE 110 moves towards access node 107, a DuCo handover is initiated. The DuCo handover involves the addition of access node 107 as a secondary node of UE 110 (shown in FIG. 1 as UE 120 at the point of the DuCo handover). After the addition of access node 107 as a secondary node of UE 110, access node 105 is serving as the primary node and access node 107 is serving as the secondary node. The DuCo handover also involves a role change, where the primary node of UE 120 (access node 105 prior to the role change) becomes the secondary node of UE 120 and the secondary node of UE 120 (access node 107 prior to the role change) becomes the primary node of UE 120. After the role change, access node 107 is serving as the primary node and access node 105 is serving as the secondary node. The DuCo handover completes with the release of the secondary node (access node 105). After the release of the secondary node, UE 125 is only served by access node 107.

The DuCo handover prevents data interruption, in the sense that the UE always has an active data path to and/or from the network, through at least one of the access nodes. During middle portion of the DuCo handover, while both source and target nodes are active, data may be transmitted to the UE in two independent streams or duplicated over the two connections present during the DuCo handover.

If the two connections share a common frequency band, coordination of transmissions over the two connections is used to avoid potential interference. Depending upon the capabilities of the UE, a variety of techniques may be used to avoid interference, including:

A dual radio UE can communicate on the two connections simultaneously with interference control occurring in the frequency domain.

A single radio UE communicates using interference control in the time domain, by time division multiplexing (TDM) of the two connections, for example.

It is noted that interference coordination if the access nodes are not synchronous may require additional techniques, e.g., guard times are used to compensate for frame and/or subframe boundary misalignment.

FIG. 2 illustrates a flow diagram of operations 200 occurring in a 3GPP DuCo handover procedure. Operations 200 begin with the addition of a target node as a secondary node (block 205). The target node is added as a primary secondary cell (PSCell) to trigger DuCo operation together with the source node. A role change of primary and secondary nodes occurs (block 210). The roles of the source node and the target node are switched in terms of primary cell (PCell) and PSCell. The secondary node is released (block 215), where the PSCell (the source node, which was the primary node prior to the role change) is released.

The 3GPP DuCo handover procedure improves the robustness of the handover process because the UE does not depend upon a single connection during the critical handover period. No additional interruption time is expected following completion of the 3GPP DuCo handover. However, the three steps involved in the 3GPP DuCo handover is longer than a normal handover and requires additional control signaling compared to a normal handover, thereby increasing the risk for a radio link failure (RLF) and/or a handover failure (HOF).

The flow diagram for the 3GPP DuCo handover shows that the 3GPP DuCo handover is sub-optimal. There are a number of events that need to occur independently to trigger the addition of the PSCell, the role change, and the PSCell release. Each of the steps has its own signaling and may need to have its own measurement triggering conditions. This compares unfavorably to a 3GPP LTE handover, which is a one-step process involving a handover request and handover response. The complexity associated with the DuCo handover results in high handover latency, even though there are no periods of data interruption.

Furthermore, more signaling also means increased vulnerability to lost messages. However, a lost message should not result in a call drop because the point of DuCo operation is that the UE has two connections and can keep using the connection that did not fail. But the lost message may result in a failed handover, e.g., leaving the UE still served by the original source node contrary to the intent of the DuCo handover. In some scenarios, the source node may fail quickly, leaving the UE with the need to recover on the target node while the target node is still the PSCell (prior to the occurrence of the role change). Therefore, there is a need for a system and method for a DuCo handover with optimized flow, reduced signaling, and fewer procedural steps.

According to an example embodiment, a DuCo handover with two steps is presented. The three-step 3GPP DuCo handover is optimized into a two-step DuCo handover procedure. The three-step procedure is optimized by combining the role change with one of the other two steps (either the addition of the PSCell or the PSCell release), producing the two-step DuCo handover procedure. The two-step DuCo handover procedure comprises a combined step and one single step. It is noted that until the PSCell is released, data can be sent to the UE on both connections of the DuCo configuration. Management of measurement events triggering the new combined step is presented below.

According to a first example embodiment, the role change is combined with the addition of the PSCell. According to a second example embodiment, the role change is combined with the PSCell release. In either example embodiment, the combined step can be triggered by a single measurement event. The measurement event reflects the combined conditions that enable the addition and/or release with the role change. Measurement behavior needed to enable the example embodiments are presented below. User plane handling (e.g., routing of data from the core network (CN) to the access nodes) needs to switch when the role change occurs, and packet forwarding is considered to ensure that the DuCo handover remains lossless.

FIG. 3A illustrates a flow diagram of example operations 300 occurring in a two-step DuCo handover where the role change is combined with the addition of the PSCell. The two-step DuCo handover comprises the addition of a target node as a secondary node (i.e., the PSCell) (block 305) and the role change (block 310) into a combined step (blocks 315). The two-step DuCo handover also comprises the release of the PSCell (block 320).

FIG. 3B illustrates a flow diagram of example operations 350 occurring in a two-step DuCo handover where the role change is combined with the PSCell release. The two-step DuCo handover comprises the addition of a target node as a secondary node (i.e., the PSCell) (block 355). The two-step DuCo handover also includes the role change (block 360) combined with release of the PSCell (block 365) into a combined step (blocks 370).

FIG. 4 illustrates a diagram 400 of transmissions occurring at devices in accordance with the first example embodiment. Diagram 400 illustrates transmissions occurring at a UE 405, a source node 407, and a target node 409, as the devices participate in a two-step DuCo handover in accordance with the first example embodiment. It is noted that diagram 400 presents a high-level view of the first example embodiment and omits some transmissions.

UE 405 transmits a first measurement report to source node 407 (event 415). The first measurement report is an event trigger for the combined event (the combined role change and addition of the PSCell event). Source node 407 sends a request message for the combined event to target node 409 (event 417). Target node 409 sends an acknowledgement message to the request for the combined event to source node 407 (event 419). UE 405 optionally transmits a second measurement report to target node 409 (event 421). Event 421 (the second measurement report) is optional if target node 409 can decide autonomously to complete the two-step DuCo handover based on event 417. The second measurement report is an event trigger for the PSCell release event. Target node 409 transmits a PSCell release request to source node 407 (event 423). It is noted that although the second measurement report is optional, the resulting handover is still not a single step handover because the addition of the PSCell and the role change need to be completed and acknowledged before the PSCell release can take place, meaning that the PSCell release remains a separate event.

The event trigger for the combined event (the first measurement report of event 415) reflects two conditions: the source node is degrading (hence the handover is needed) and a neighbor node (the target node) is strong enough to be a PSCell candidate. In 3GPP LTE, there are two separate measurement events: event A2 (indicating that serving node becomes worse than a threshold) and event A3 (indicating that neighbor node becomes an offset better than PCell and/or PSCell). Event M is a close combination that indicates that PCell and/or PSCell have become worse than a first threshold (threshold 1) and that neighbor node has become better than a second threshold (threshold 2). However, event M does not capture the relationship between the PCell and/or PSCell and the neighbor node as does event A 3.

According to an example embodiment, a new event indicating that serving node has become worse than a threshold and that a neighbor node has become an offset better than PCell and/or PSCell is provided. It is noted that the new event is not equivalent to neighbor node has become better than a threshold plus an offset, because if the serving node has quickly become significantly worse than the threshold, the trigger level for the target node is correspondingly lower than the threshold plus the offset. The new event provides for the correct behavior because if the serving node quality drops quickly, the requirement of a target node of sufficient quality (a good enough target node) is correspondingly looser. In other words, the network is more willing to use a target node to let the UE recover from the rapid degradation of the serving node. The offset from the PCell and the neighbor node should be small in typical conditions (the offset should be positive however, as opposed to the offset of event A 3, which may be negative).

Network handling of the new event may be to trigger the combined event of the addition of the PSCell and the role change.

Figure 5:
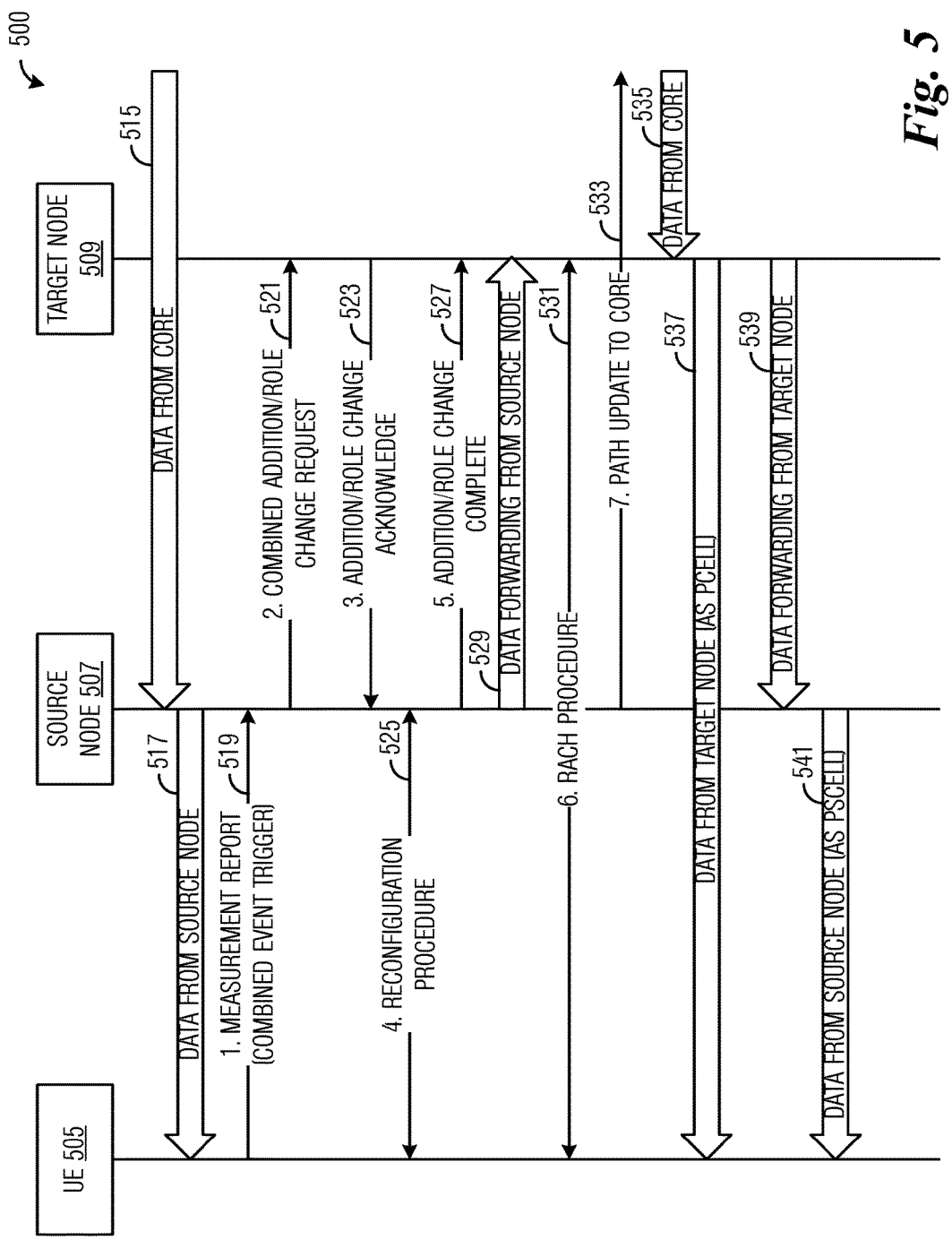
FIG. 5 illustrates a diagram of processing performed by and transmissions made by devices participating in a two-step DuCo handover with a combined PSCell addition and role change according to example embodiments described herein.

FIG. 5 illustrates a diagram 500 of processing performed by and transmissions made by devices participating in a two-step DuCo handover with a combined PSCell addition and role change. Diagram 500 illustrates processing performed by and transmissions made by a UE 505, a source node 507, and a target node 509, as the devices participate in a two-step DuCo handover with a combined PSCell addition and role change.

Source node 507 receives data intended for UE 505 from the core network (event 515). Source node 507 forwards data received from the core network to UE 505 (event 517). UE 505 transmits a measurement report to source node 507 (event 519). The measurement report is an event trigger for the combined PSCell addition and role change event. Source node 507 sends message including a combined PSCell addition request and a role change indication to target node 509 (event 521). Target node 509 is identified in the measurement report and is a neighbor node that meets the conditions of the event. Target node 509 sends a combined PSCell addition and role change acknowledge message to source node 507 (event 523). UE 505 and source node 507 exchange transmissions in a reconfiguration procedure (event 525). One of the transmissions exchanged between UE 505 and source node 507 serves as an indicator of the role change at source node 507 and target node 509. Source node 507 sends a combined PSCell addition and role change complete message to target node 509 (event 527). Source node 507 forwards data intended for UE 505 to target node 509 (event 529). The data forwarded by source node 507 includes data that source node 507 has received from the core network but source node 507 has not had the opportunity to transmit to UE 505 before the combined PSCell addition and role change completed.

UE 505 and target node 509 participate in a random access procedure (event 531). The random access procedure is commonly referred to as a RACH procedure. The random access procedure establishes a connection between UE 505 and target node 509. The transmission of a random access resource by UE 505 to target node 509 may be an event trigger initiating the PSCell release. Source node 505 sends a path update to the core network (event 533). The path update may alternatively serve as an indicator of the role change at source node 507 and target node 509. The path update informs the core network that target node 509 is now the PCell of UE 505.

After the path update has occurred, target node 509 receives data intended for UE 505 from the core network (event 535). Target node 509 forwards data received from the core network and source node 507 to UE 505 (event 537). Because a connection between source node 507 and UE 505 is still available, the connection may be exploited to improve communications performance. Target node 509 sends data intended for UE 505 to source node 507 (event 539). The data sent by target node 509 to source node 507 may be formatted and routed in accordance with a split bearer configuration. Source node 507 forwards the data to UE 505 (event 541). It is noted that at some point, the connection between source node 507 and UE 505 will be discarded when source node 507 is released from operating as PSCell. The releasing of source node 507 from operating as PSCell may involve the release of the context of UE 505 from source node 507. In other words, the UE context of UE 505 is released from source node 507. Source node 507 may receive an instruction from target node 509 to release the UE context of UE 505.

As shown in FIG. 5, the PSCell addition and the role change occur together and are acknowledged together. Therefore, there is no data delivered through target node 509 when it is operating as a PSCell. Data delivery through the target node begins after the path update, event 533. After the path update, no additional data comes to UE 505 from source node 507 until target node 509 begins to deliver data to source node 507 after target node 509 begins operating as PCell. It is noted that the amount of time that source node 507 is not delivering data should be short. The delivery of data by source node 507 may continue until a second event resulting in the release of source node 507 as PSCell completes.

Figure 6:
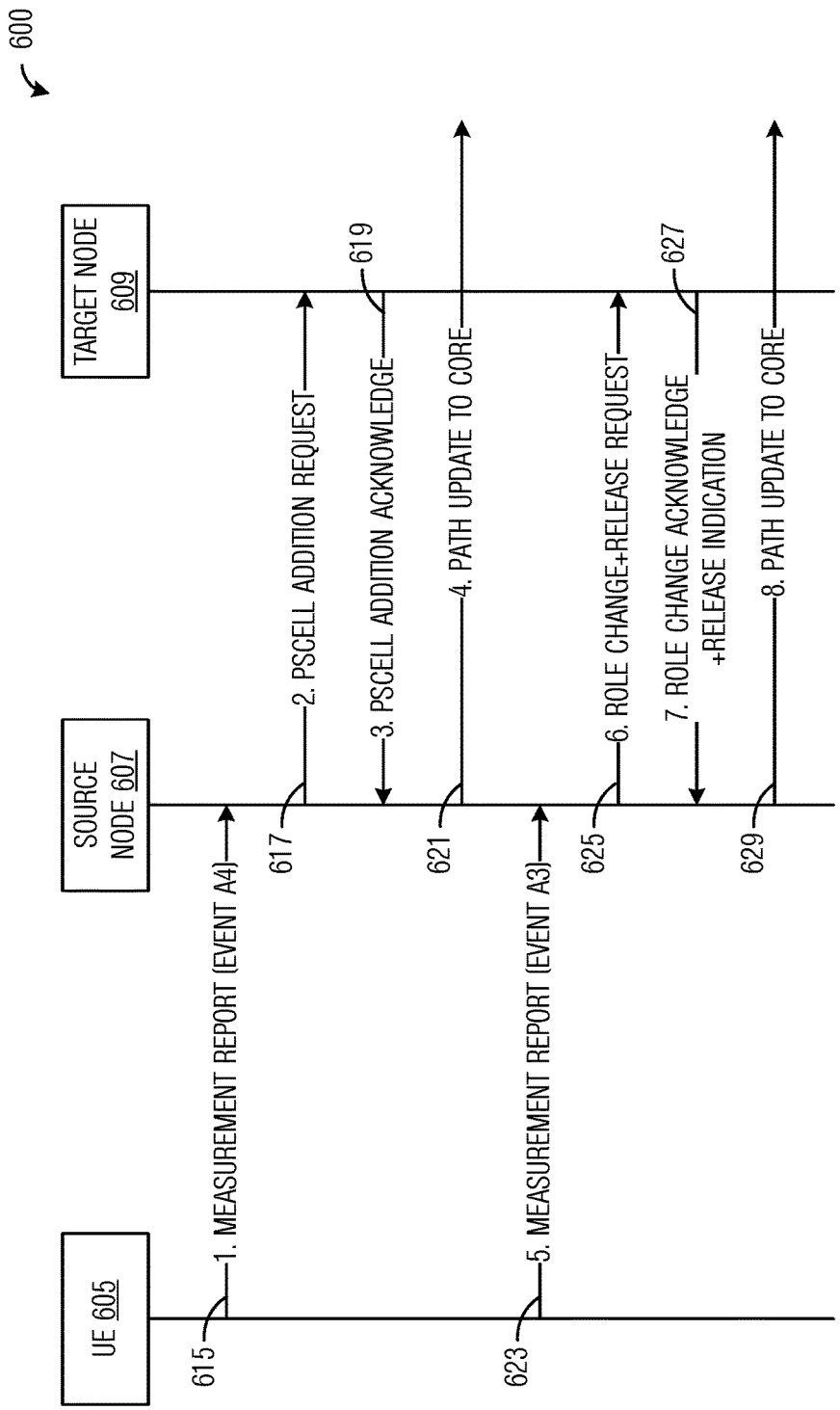
FIG. 6 illustrates a diagram of transmissions occurring at devices in accordance with the second example embodiment described herein.

FIG. 6 illustrates a diagram 600 of transmissions occurring at devices in accordance with the second example embodiment. Diagram 600 illustrates transmissions occurring at a UE 605, a source node 607, and a target node 609, as the devices participate in a two-step DuCo handover in accordance with the second example embodiment. It is noted that diagram 600 presents a high-level view of the second example embodiment and omits some transmissions.

UE 605 transmits a first measurement report to source node 607 (event 615). The first measurement report is an event trigger for the addition of the PSCell. Source node 607 sends a PSCell addition request message to target node 609 (event 617). Target node 609 sends a PSCell addition acknowledgement message to source node 607 (event 619). Source node 607 sends a path update to the core network (event 621).

UE 605 transmits a second measurement report to source node 607 (event 623). The second measurement report is an event trigger for a combined event (the combined role change and PSCell release event). Source node 607 sends a role change and PSCell release request message to target node 609 (event 625). Target node 609 sends a message including a role change acknowledge and PSCell release indication to source node 607 (event 627). Source node 607 sends a path update to the core network (event 629).

According to the second example embodiment, both measurement reports, events 615 and 623, are necessary because the radio conditions triggering the release of source node 607 are separate from the conditions reported to trigger the addition of the PSCell. It is noted that the conditions associated with event 615 should be relaxed to prevent a situation where the quality of source node 607 crashes before the path update is delivered to the core network, event 621.

In the second example embodiment, the PSCell addition proceeds as normal, so packets are delivered through source node 607 operating as the PCell and target node 609 operating as the PSCell, as in 3GPP LTE. Hence, simultaneous data transmission over the two connections may occur until event A3 is triggered by second measurement report, event 623.

At event A3, source node 607 triggers the role change and the PSCell release, and stops operating as the PCell. If the PSCell release is executed immediately, no data is delivered through source node 607 during its brief lifetime as PSCell. Any data that arrives at source node 607 from the core network while source node 607 is operating as PSCell is forwarded to target node 609 (which is now operating as PCell).

Alternatively, the PSCell release may be delayed until after the path switch (path update, event 629) to allow simultaneous delivery to continue for a short time after the role change. In such a situation, data would arrive at target node 609 (operating as PCell) and will be forwarded to source node 607 (operating as PSCell) in accordance with legacy operation. There remains no separate triggering event for the PCell release in this alternative so from the technical standards point of view it remains a two-step handover procedure. A decision on when to stop simultaneous delivery may be up to the network implementation of target node 609.

Figure 7:
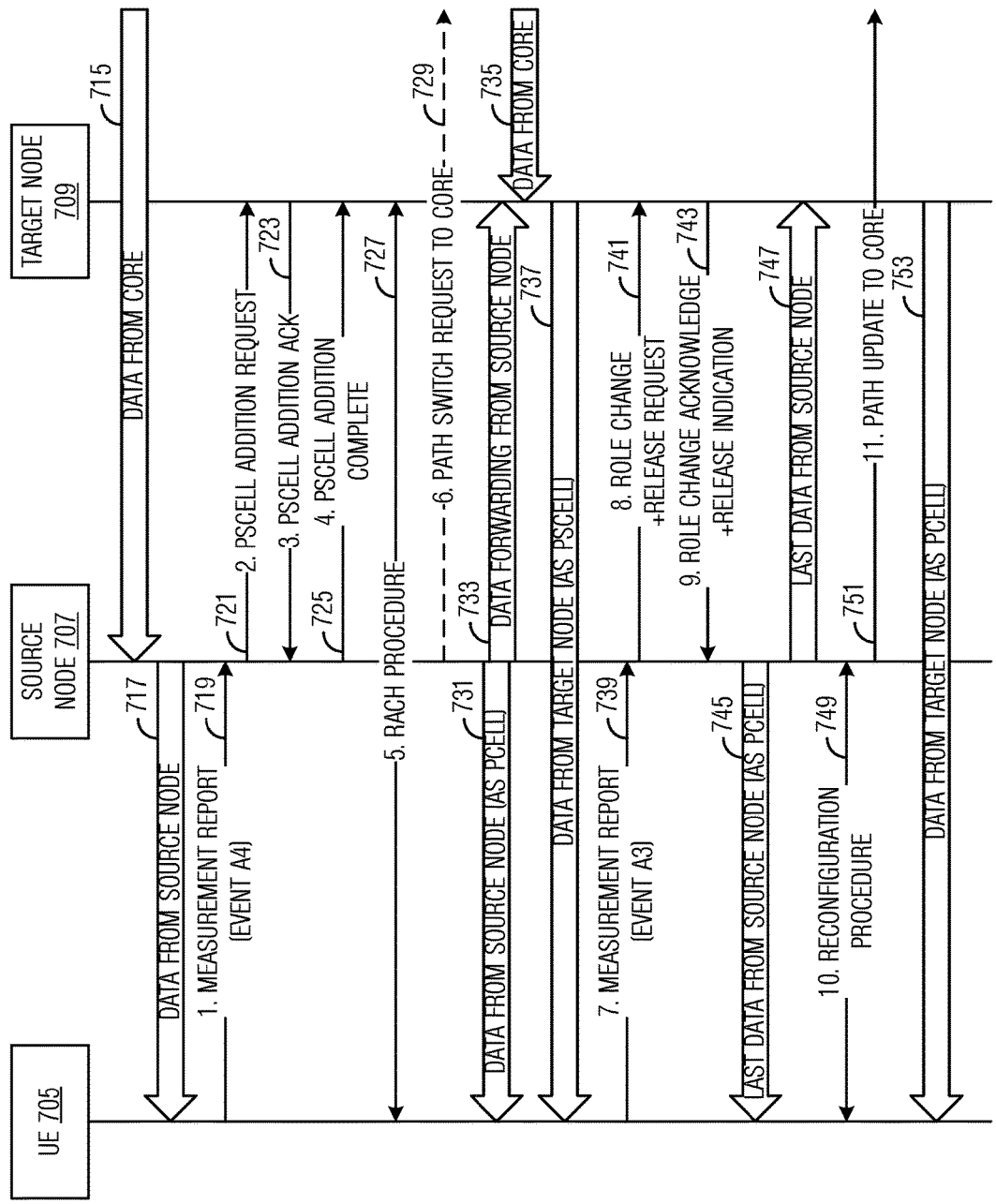
FIG. 7 illustrates a diagram of processing performed by and transmissions made by devices participating in a two-step DuCo handover with a combined role change and PSCell release according to example embodiments described herein.

FIG. 7 illustrates a diagram 700 of processing performed by and transmissions made by devices participating in a two-step DuCo handover with a combined role change and PSCell release. Diagram 700 illustrates processing performed by and transmissions made by a UE 705, a source node 707, and a target node 709, as the devices participate in a two-step DuCo handover with a combined role change and PSCell release.

Source node 707 receives data intended for UE 705 from the core network (event 715). Source node 707 forwards data received from the core network to UE 705 (event 717). UE 705 transmits a first measurement report to source node 707 (event 719). The first measurement report is an event trigger for the PSCell addition event. Source node 707 sends a PSCell addition request message to target node 709 (event 721). Target node 709 is identified in the measurement report and is a neighbor node that meets the conditions of the event.

Target node 709 sends a PSCell addition acknowledgement message to source node 707 (event 723). Source node 707 sends a PSCell addition complete message to target node 709 (event 725).

UE 705 and target node 709 participate in a random access procedure (event 727). The random access procedure establishes a connection between UE 705 and target node 709. Source node 707 optionally sends a path switch request to the core network (event 729). Source node 707, operating as PCell, sends data to UE 705 (event 731) and forwards data for UE 705 to target node 709 (event 733). The data forwarded from source node 707 to target node 709 may be formatted and routed in accordance with a split bearer configuration. Target node 709 may also receive data intended for UE 705 from the core network (event 735). Target node 709, operating as PSCell, forwards data to UE 705 (event 737).

UE 705 transmits a second measurement report to source node 707 (event 739). The second measurement report is an event trigger for the combined role change and PSCell release event. Source node 707 sends a role change and PSCell release request message to target node 709 (event 741). Target node 709 sends message including a role change acknowledgement and a PSCell release indication to source node 707 (event 743). Source node 707, operating as PCell, forwards any remaining data to UE 705 (event 745) and forwards the data to target node 709 (event 747).

Source node 707 and UE 705 participate in a reconfiguration procedure by exchanging transmissions (event 749). One of the transmissions exchanged between UE 705 and source node 707 serves as an indicator of the role change at source node 707 and target node 709. The reconfiguration procedure ends the over the air (OTA) data transmission from source node 707. Any further data received from the core network is forwarded to target node 709 as packet data convergence protocol (PDCP) protocol data units (PDUs) to be delivered on a radio bearer of target node 709. Source node 707 sends a path update to the core network (event 751). The path update starts delivery of data from the core network to target node 709 (operating as PCell). The path update may alternatively serve as an indicator of the role change at source node 707 and target node 709. Target node 709, operating as PCell, forwards data to UE 705 (event 753).

It is noted that from events 727 to 749, packets can be duplicated OTA. In other words, UE 705 may receive the same data from both source node 707 and target node 709 to ensure data continuity is maintained.

An optional path switch request, event 729, is applicable in the situation where the core network immediately sets up a secondary cell group (SCG) bearer. The early path switch request takes the earliest possible opportunity to deliver data from the core network through target node 709. It is reasonable for the core network to prefer data delivery through target node 709 because target node 709 is expected to present a better quality link in the near future, while the link through source node 707 is potentially failing. Although SCG bearer is not a required behavior, it may be reasonable to set it up at this point.

According to an example embodiment, during a role change, a UE and the network are able to process packets according to a split between sublayers of the PDCP layer. This results in the UE operating with a dual PDCP entity, with certain functions that are different between the PCell and the PSCell. In the split bearer, the source node (operating as PCell) may handle PDCP sequence number assignment and robust header compression (RoHC), before passing the packet to the target node (operating as PSCell), in the downlink direction; the target node may then handle ciphering and header addition. For the uplink direction, the target node handles deciphering and header removal before passing the packet to the source node for upper sublayers of the PDCP layer, where the source node handles header decompression and PDCP sequence number management. Alternatively, during a role change, a UE and the network are able to process packets according to a split between the PDCP layer and the RLC layer. This results in the UE operating with a single PDCP entity. In the split bearer scenario, the source node (operating as PCell) may handle all of the PDCP functions including sequence number assignment, RoHC, and packet ciphering, before passing the packet (PDCP PDU) to the target node (operating as PSCell), in the downlink direction; the target node may then deliver the PDCP PDU to the RLC layer for OTA transmission. For the uplink direction, the target node handles RLC layer functions before passing the packet to the source node for PDCP layer, where the source node handles deciphering, header decompression, PDCP sequence number management and packet reordering. The following description of FIG. 8A focuses on the case where UE operates with a dual PDCP entity.

Figure 8A:
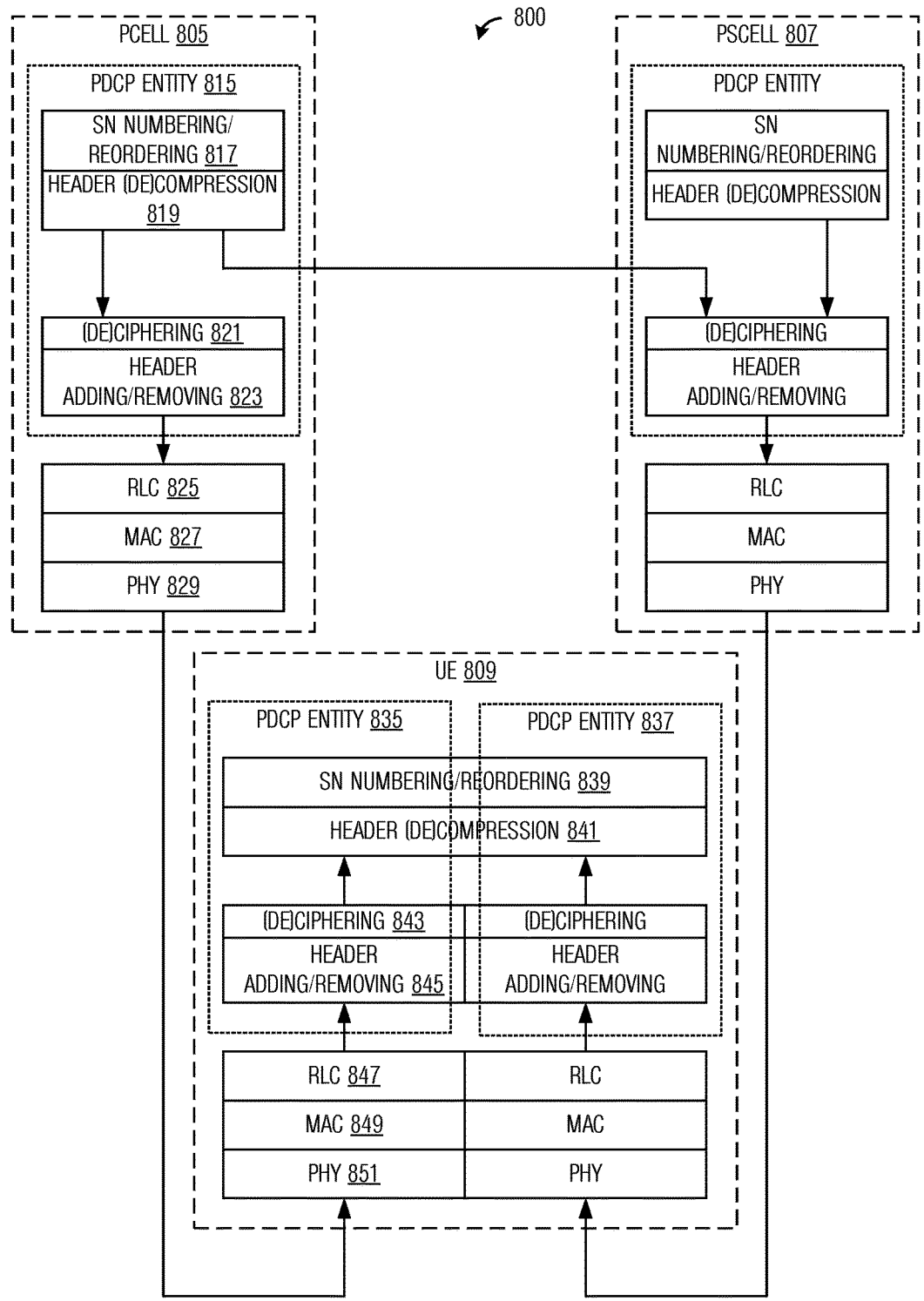
FIG. 8A illustrates a sublayer view of devices participating in a role change phase of a two-step DuCo handover according to example embodiments described herein.

FIG. 8A illustrates a sublayer view of devices 800 participating in a role change phase of a two-step DuCo handover. Shown in FIG. 8A are sublayer views of a PCell 805, a PSCell 807, and a UE 809. PCell 805 includes a PDCP entity 815 with a sequence number (SN) numbering/reordering unit 817, a header compression/decompression unit 819, a ciphering/deciphering unit 821, and a header adding/removing unit 823. PCell 805 also includes a radio link control (RLC) entity 825, a medium access control (MAC) entity 827, and a physical (PHY) layer entity 829. PSCell 807 also features a similar structure.

UE 809 includes dual PDCP entities 835 and 837, with one PDCP entity for PCell 805 and one PDCP entity for PSCell 807. The dual PDCP entities can include separate SN numbering/reordering unit and RoHC (header compression/decompression) unit within each PDCP, or include a common SN numbering/reordering unit 839 and a common header compression/decompression unit 841 to process packets for communication with PCell 805 and PSCell 807. Each of the dual PDCP entities also includes a ciphering/deciphering unit and a header adding/removing unit, for processing packets for communication with either of PCell 805 and PSCell 807. UE 809 further includes dual RLC, MAC, and PHY entities. As an illustrative example, UE 809 uses PHY entity 851, MAC entity 849, RLC entity 847, header adding/removing unit 845, and ciphering/deciphering unit 843 to process packets received from PCell. Deciphered packets may be provided to common SN numbering/reordering unit 839 and common header compression/decompression unit 841, along with deciphered packets from PSCell 807 (after processing by corresponding entities and units of UE 809).

The two ciphering/deciphering units at UE 809 reduce the interruption of reset or reconfiguration, by having a separate ciphering/deciphering unit dedicated to each one of PCell 805 and PSCell 807. The different units and entities of PCell 805, PSCell 807, and UE 809 synchronize as the role change between PCell 805 and PSCell 807 takes place.

When PCell 805 and PSCell 807 change roles, upper PDCP functions (i.e., SN reordering unit and header compression/decompression unit) need to be reset, but lower PDCP functions (i.e., ciphering/deciphering unit and header adding/removing unit) may be maintained because they are independent of the roles served by the access nodes (e.g., PCell or PSCell) that transmitted the packets.

UE 809 uses ciphering/deciphering unit 843 when communicating OTA with PCell 805 before or after the role change, and corresponding ciphering/deciphering unit when communicating OTA with PSCell 807. However, at the role change, UE 809 switches which set of upper PDCP functions is used for PCell 805 and PSCell 807. If the switch does not take place, there is a risk that, for example, an uplink packet is processed for PCell 805 (header compression/decompression unit 841) but is delivered to PSCell 807 (now operating as a PCell) OTA, just after the role change, and passed on to the upper PDCP functions (SN reordering unit and header compression/decompression unit) of PSCell 807.

According to an example embodiment, the switching process can be controlled by a PDCP layer control PDU. As an example, the PDCP entity of the source cell may send a specific PDCP control PDU to the UE to indicate the switching. Alternatively, an end marker can be put into the header of the last PDCP PDU sent by the source node to indicate the switching. In this case, the end marker indicates to the UE the SN boundary for the switching. The PDCP PDU with a SN larger than the SN of the PDCP PDU carrying the end marker will be transmitted by the target node. As an additional alternative, the switching process can be synchronized by aligning on a particular system frame number (SFN) or some other time marker of the switch. When the UE is reconfigured for the role change, the UE is given an activation time, i.e., an indication of an instant at which the role change will take place. Therefore, the PDCP layer control PDU, the end marker present in a PDCP PDU, the activation time, or some other indicator usable in marking the switch may be referred to as a switch indicator. The abovementioned switching process is described for the downlink, where the network controls the switching process for downlink, and when the UE receives the switching indicator, the UE will act accordingly for a subsequent uplink transmission. Therefore, transmissions in both downlink and uplink can be switched. As an additional alternative, the UE can signal the network via the similar methods described above (i.e., PDCP layer control PDU, the end marker present in a PDCP PDU, the activation time, or some other indicator usable in marking the switch) to inform the network of the switching process for uplink transmission and the network can act accordingly for a subsequent downlink transmission. Furthermore, the UE and the network can signal the uplink switching process and downlink switching process separately, i.e., the UE indicates the uplink switching to the network and the network indicates the downlink switching to the UE.

With respect to the split bearer, packet processing before the activation time uses the upper PDCP functions of PDCP entity 815 of PCell 805. Packet processing after the activation time uses the upper PDCP functions of the PDCP entity of PSCell 807.

The selection of which lower PDCP functions to use is based on which node (source node or target node) the UE is communicating with OTA, independent of which one is the PCell or the PSCell.

With respect to duplicate packets, duplicate detection in PDCP has been performed at the PDU level. However, because the SN is assigned to service data units (SDUs) in the upper PDCP functions, a single SDU may be processed into two different PDCP PDUs by the lower PDCP functions of the two different PDCP entities. Thus cases may occur in which an SDU is transmitted once through PCell 805 and once through PSCell 807, but the resulting PDUs cannot be recognized as duplicates by the receiving entity. That is, the existing methods of PDCP duplicate detection can fail in this sublayered PDCP design.

According to an example embodiment, the PDCP entities perform duplicate detection at the SDU level. In other words, a receiving PDCP entity first processes the PDUs and when a SDU is generated, the receiving PDCP entity checks the SN against those of previously received SDUs.

Figures 8B, 8C:
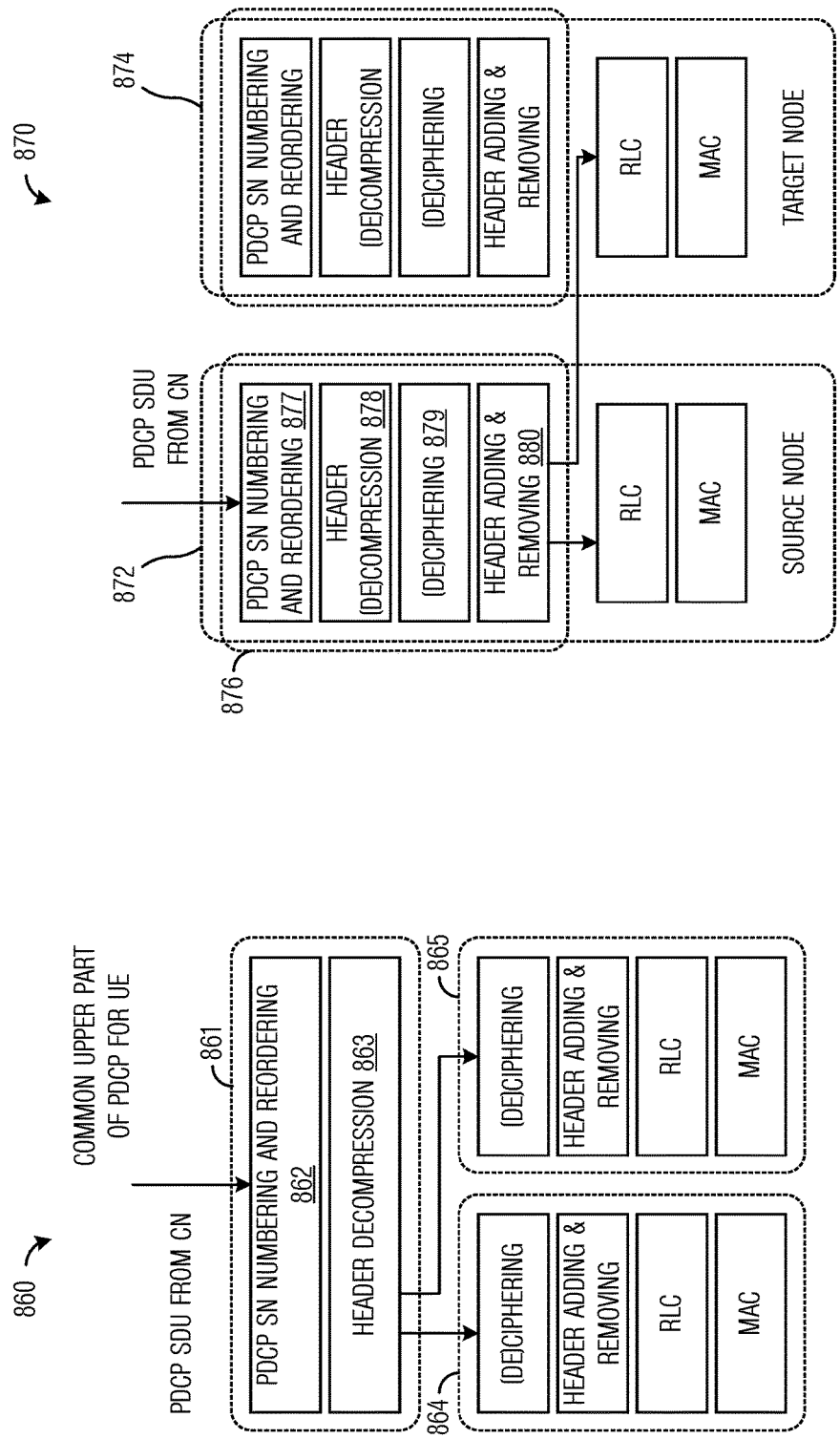
FIG. 8B illustrates a logical view of access nodes participating in a role change phase of a two-step DuCo handover as presented in FIG. 8A according to example embodiments described herein.
FIG. 8C illustrates a logical view of access nodes participating in a role change phase of a two-step DuCo handover where the source node performs the PDCP functions according to example embodiments described herein.

FIG. 8B illustrates a logical view of access nodes 860 participating in a role change phase of a two-step DuCo handover as presented in FIG. 8A. Upper PDCP functions (such as sequence numbering 862, and RoHC 863) are performed by a single PDCP entity 861, such as at the source node operating as a PCell, while lower PDCP functions (such as ciphering/deciphering, and header adding/removing), as well as RLC and MAC entities are performed separately by lower PDCP entities 864 and 865 at the source node and the target node.

FIG. 8C illustrates a logical view of access nodes 870 participating in a role change phase of a two-step DuCo handover where the source node performs the PDCP functions. As shown in FIG. 8C, source node 872 (operating as PCell) provides PDCP processing (by PDCP entity 876, for example) for downlink packets before passing at least some of the processed packets to target node 874 (operating as PSCell). PDCP entity 876 may include sequence numbering and reordering 877, header decompression 878, deciphering 879, and header removing 880.

Figure 8D:
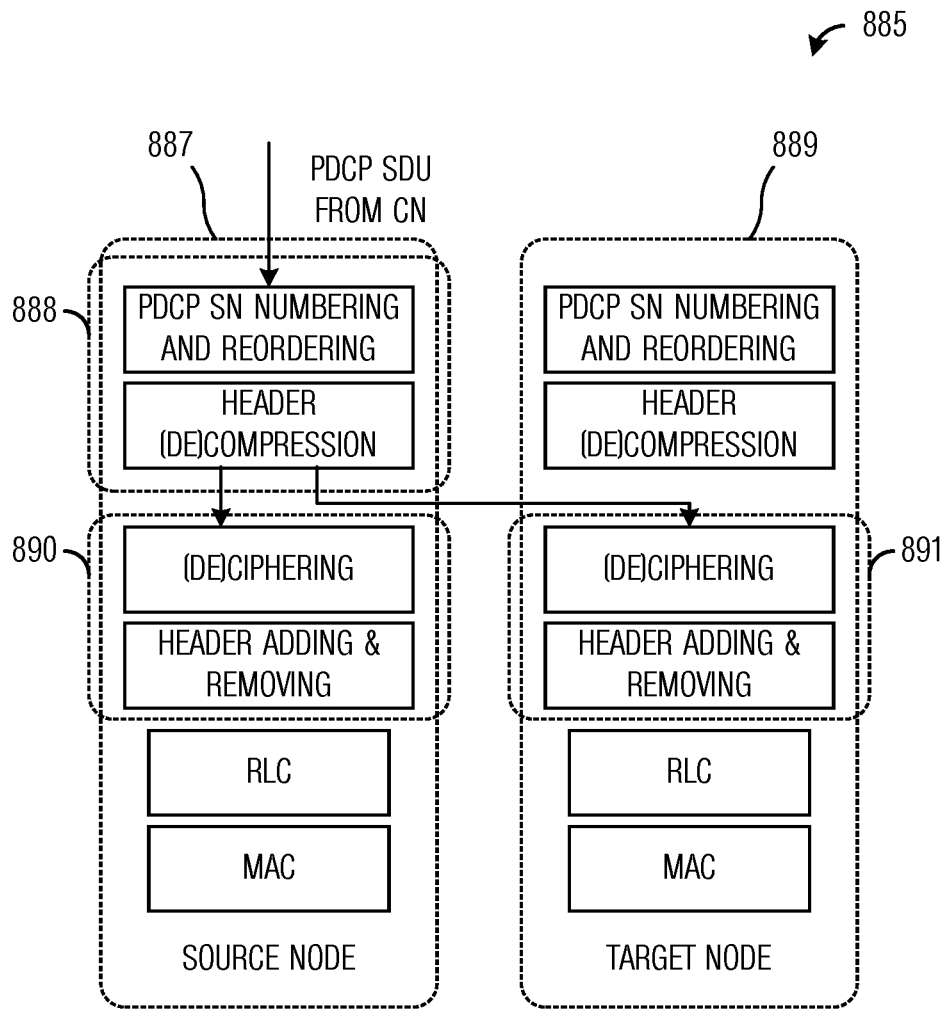
FIG. 8D illustrates a logical view of access nodes participating in a role change phase of a two-step DuCo handover where the source node performs the upper PDCP functions according to example embodiments described herein.

FIG. 8D illustrates a logical view of access nodes 885 participating in a role change phase of a two-step DuCo handover where the source node performs the upper PDCP functions. As shown in FIG. 8D, source node 887 (operating as PCell) provides upper PDCP processing (by upper PDCP entity 888, for example) for downlink packets before passing at least some of the processed packets to target node 889 (operating as PSCell). Source node 887 and target node 889 provide lower PDCP processing (by lower PDCP entity 890 of source node 887 and lower PDCP entity 891 of target node 889, for example) for their respective processed packets. PDCP entity of target node 889 may be operating as a slave PDCP entity.

Figures 9A, 9B:
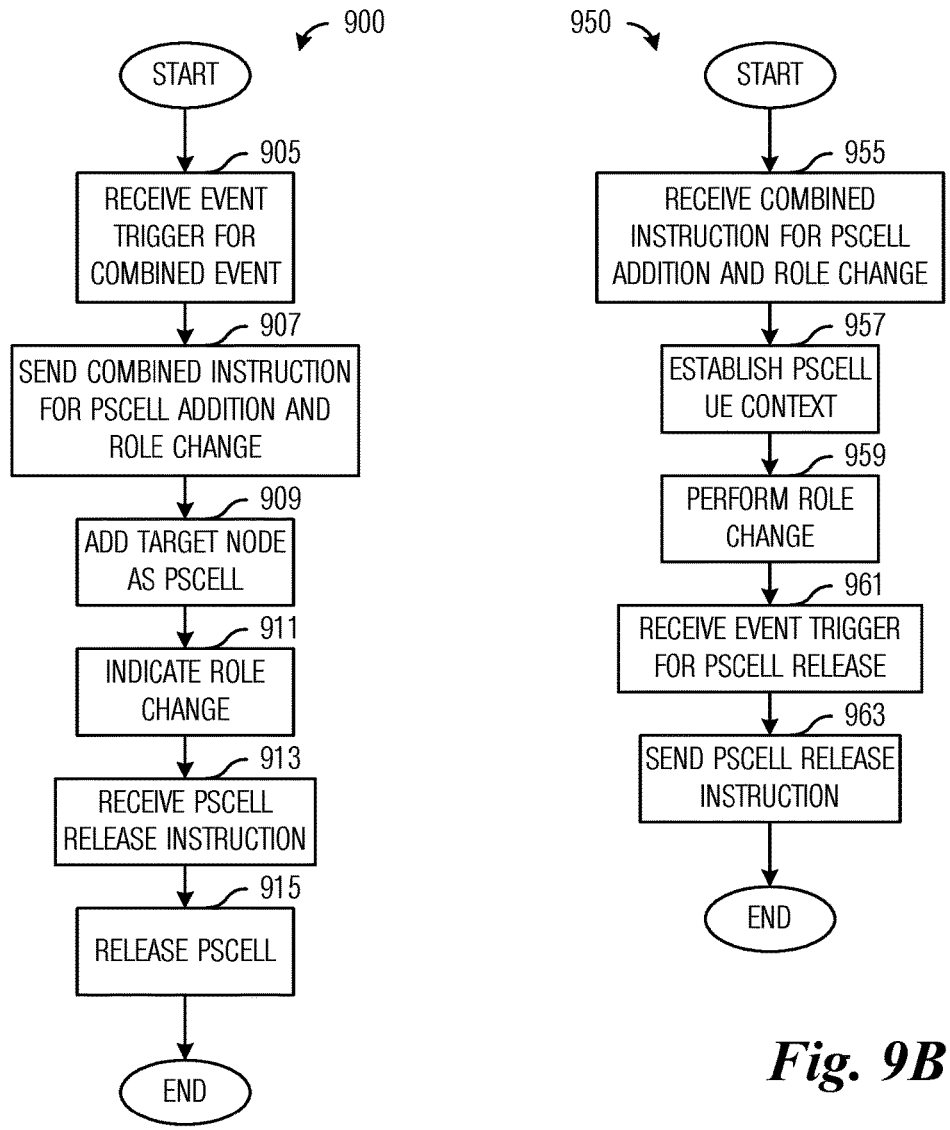
FIG. 9A illustrates a flow diagram of example operations occurring in a source node participating in a two-step DuCo handover according to the first example embodiment described herein.
FIG. 9B illustrates a flow diagram of example operations occurring in a target node participating in a two-step DuCo handover according to the first example embodiment described herein.

FIG. 9A illustrates a flow diagram of example operations 900 occurring in a source node participating in a two-step DuCo handover according to the first example embodiment. Operations 900 may be indicative of operations occurring in a source node that is participating in a two-step DuCo handover.

Operations 900 begin with the source node receiving an event trigger for a combined event (block 905). The event trigger may be a measurement report received from a UE. The combined event includes a PSCell addition and a role change. The source node sends a combined instruction for the PSCell addition and the role change to a target node (block 907). The target node may be indicated in the measurement report from the UE. The combined instruction may be a message including a PSCell addition request and a role change indication. The source node adds the target node as a PSCell (block 909). The adding of the target node as a PSCell is part of the PSCell adding process. The source node indicates the role change to the UE (block 911). Indicating the role change initiates the role change process. As an example, the indication of the role change takes place during the reconfiguration procedure. As another example, the indication of the role change takes place during the path update. The source node completes the two-step DuCo handover by receiving a PSCell release instruction (block 913) and releasing the PSCell (block 915). The PSCell release instruction may be received from the target node. Releasing the PSCell may involve releasing or deleting the UE context of the UE in the PSCell (the source node).

FIG. 9B illustrates a flow diagram of example operations 950 occurring in a target node participating in a two-step DuCo handover according to the first example embodiment. Operations 950 may be indicative of operations occurring in a target node that is participating in a two-step DuCo handover.

Operations 950 begin with the target node receiving a combined instruction for PSCell addition and role change from the source node (block 955). The combined instruction may be a message including a PSCell addition request and a role change indication. The combined instruction for PSCell addition and role change may include a role change indication. The target node establishes a UE context for the UE (block 957), thereby performing the PSCell addition. The target node performs the role change (block 959). The target node receives an event trigger for the PSCell release (block 961). The event trigger for the PSCell release may be a transmission received from the UE. The target node sends a PSCell release instruction to the source node (block 963).

Figures 10A, 10B:
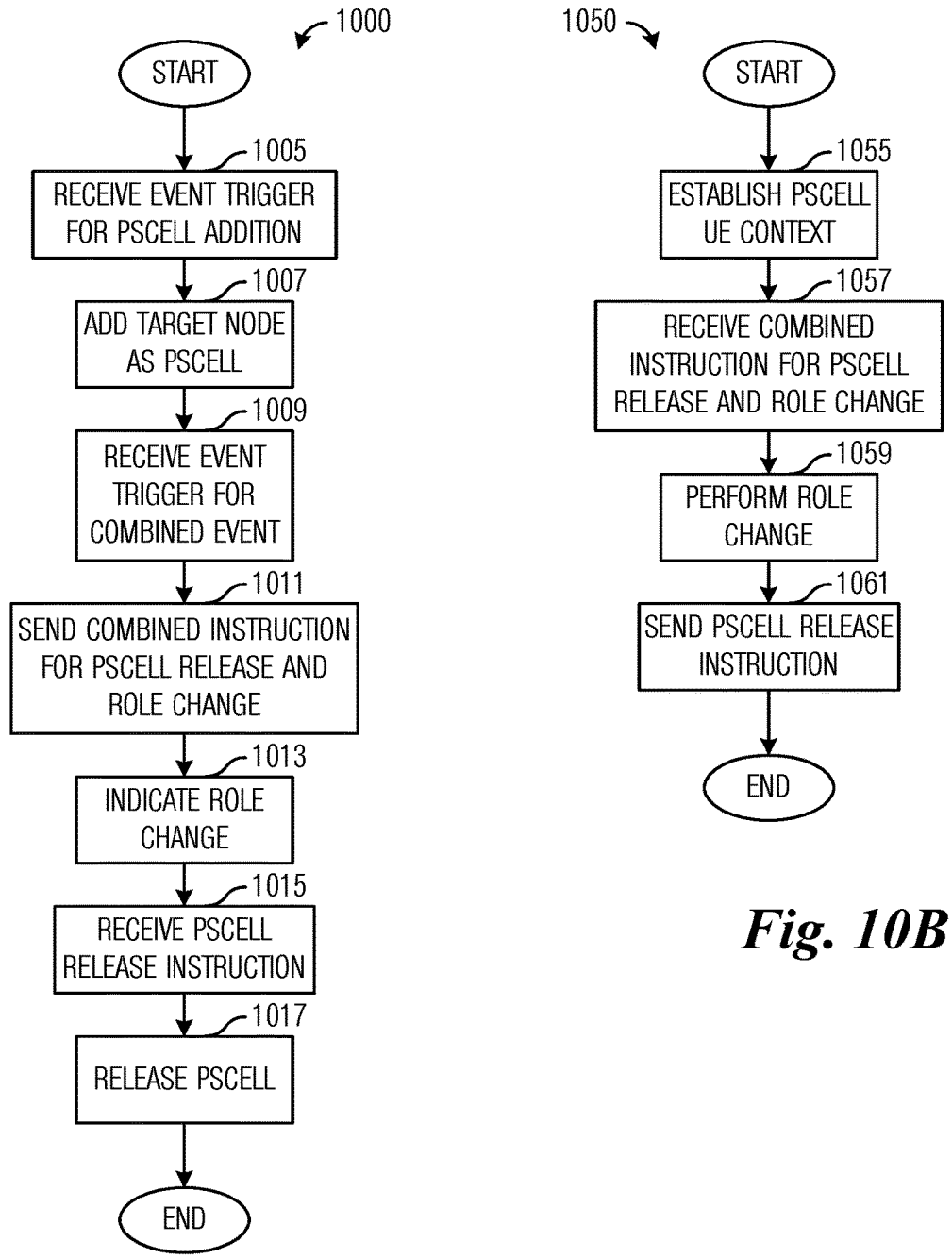
FIG. 10A illustrates a flow diagram of example operations occurring in a source node participating in a two-step DuCo handover according to the second example embodiment described herein.
FIG. 10B illustrates a flow diagram of example operations occurring in a target node participating in a two-step DuCo handover according to the second example embodiment described herein.

FIG. 10A illustrates a flow diagram of example operations woo occurring in a source node participating in a two-step DuCo handover according to the second example embodiment. Operations 1000 may be indicative of operations occurring in a source node that is participating in a two-step DuCo handover.

Operations 1000 begin with the source node receiving an event trigger for PSCell addition (block 1005). The event trigger may be a measurement report from the UE. The source node adds the target node as a PSCell (block 1007). The target node may be indicated in the measurement report. The source node receives an event trigger for a combined event (block 1009). The combined event includes a role change and a PSCell release. The source node sends a combined instruction for the role change and the PSCell release to the target node (block ion). The combined instruction may be a message including a role change indicator and a PSCell release request. The source node indicates the role change to the UE (block 1013). Indicating the role change initiates the role change process. As an example, the indication of the role change takes place during the reconfiguration procedure. As another example, the indication of the role change takes place during the path update. The source node receives a PSCell release instruction (block 1015) and releases the PSCell (block 1017). The PSCell release instruction may be received from the target node. Releasing the PSCell may involve releasing or deleting the UE context of the UE at the PSCell (the source node).

FIG. 10B illustrates a flow diagram of example operations 1050 occurring in a target node participating in a two-step DuCo handover according to the second example embodiment. Operations 1050 may be indicative of operations occurring in a target node that is participating in a two-step DuCo handover.

The target node establishes a UE context for the UE (block loss), thereby performing a PSCell addition. The target node receives a combined instruction for the role change and the PSCell release from the source node (block 1057). The combined instruction for the role change and the PSCell release may include a role change indication. The target node performs the role change (block 1061). The target node sends a PSCell release instruction to the source node (block 1063).

Figures 11, 12:
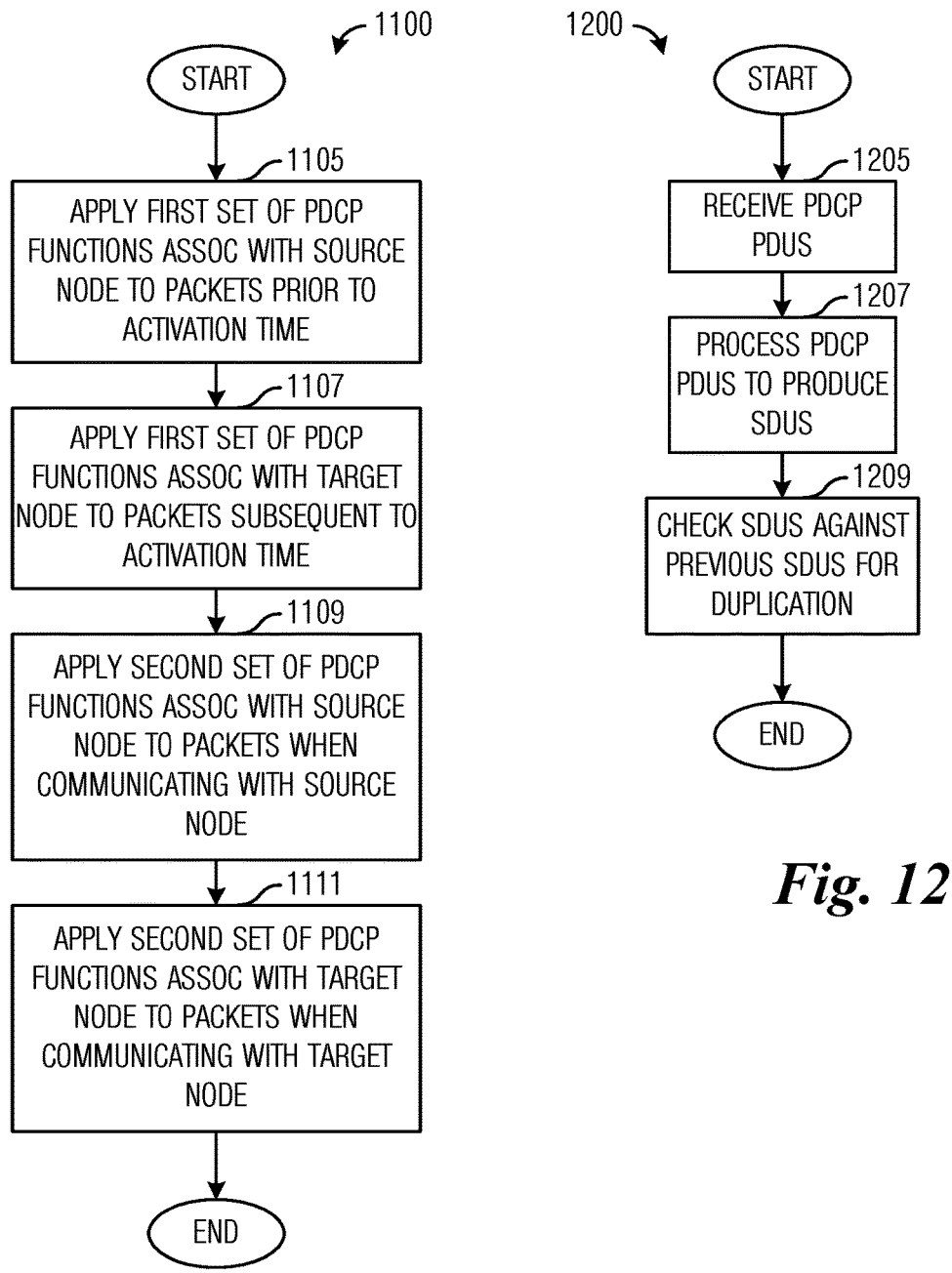
FIG. 11 illustrates a flow diagram of example operations occurring in a layered PDCP entity of a UE processing received packets during a role change of a DuCo handover according to example embodiments described herein.
FIG. 12 illustrates a flow diagram of example operations occurring in a device processing PDCP packets according to example embodiments described herein.

FIG. 11 illustrates a flow diagram of example operations 1100 occurring in a layered PDCP entity of a UE processing received packets during a role change of a DuCo handover. Operations 1100 may be indicative of operations occurring in a layered PDCP entity of a UE processing received packets during a role change of a DuCo handover.

Operations 1100 begin with the UE applying a first set of PDCP functions that are associated with the source node to packets received before the activation time (block 1105). The first set of PDCP functions associated with the source node includes sequence number assignment and header compression. The UE applies a first set of PDCP functions that are associated with the target node to packets received after the activation time (block 1107). The first set of PDCP functions associated with the target node includes sequence number assignment and header compression. The UE applies a second set of PDCP functions that are associated with the source node when communicating with the source node (block 1109). The second set of PDCP functions associated with the source node includes header addition and/or removal and deciphering and/or ciphering. The UE applies a second set of PDCP functions that are associated with the target node when communicating with the target node (block 1111). The second set of PDCP functions associated with the target node includes header addition and/or removal and deciphering and/or ciphering.

FIG. 12 illustrates a flow diagram of example operations 1200 occurring in a device processing received PDCP packets. Operations 1200 may be indicative of operations occurring in a device that is processing received PDCP packets.

Operations 1200 begin with the device receiving PDCP PDUs (block 1205). The device processes the PDCP PDUs to produce SDUs (block 1207). Processing the PDCP PDUs includes using lower PDCP functions associated with an access node with which the device is communicating and upper PDCP functions associated with a PCell of the device. The upper PDCP functions include at least sequence number assignment. The device checks the SDUs against previously produced SDUs for duplicates (block 1209).

Figure 13:
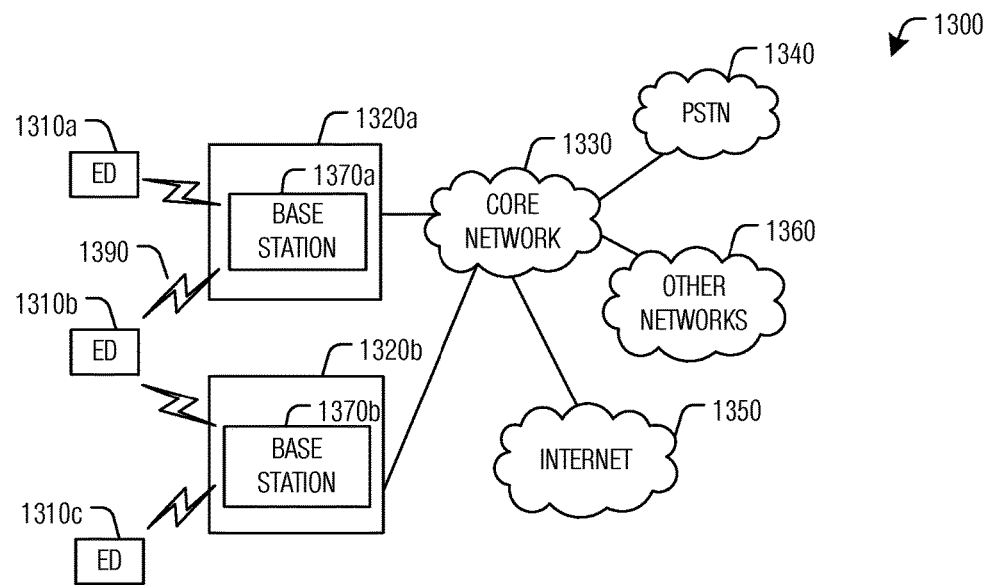
FIG. 13 illustrates an example communication system according to example embodiments described herein.

[oils] FIG. 13 illustrates an example communication system 1300. In general, the system 1300 enables multiple wireless or wired users to transmit and receive data and other content. The system 1300 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1300 includes electronic devices (ED) 1310a-1310c, radio access networks (RANs) 1320a-1320b, a core network 1330, a public switched telephone network (PSTN) 1340, the Internet 1350, and other networks 1360. While certain numbers of these components or elements are shown in FIG. 13, any number of these components or elements may be included in the system 1300.

The EDs 1310a-1310c are configured to operate and/or communicate in the system 1300. For example, the EDs 1310a-1310c are configured to transmit and/or receive via wireless or wired communication channels. Each ED 1310a-1310c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1320a-1320b here include base stations 1370a-1370b, respectively. Each base station 1370a-1370b is configured to wirelessly interface with one or more of the EDs 1310a-1310c to enable access to the core network 1330, the PSTN 1340, the Internet 1350, and/or the other networks 1360. For example, the base stations 1370a-1370b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 1310a-1310c are configured to interface and communicate with the Internet 1350 and may access the core network 1330, the PSTN 1340, and/or the other networks 1360.

In the embodiment shown in FIG. 13, the base station 1370a forms part of the RAN 1320a, which may include other base stations, elements, and/or devices. Also, the base station 1370b forms part of the RAN 1320b, which may include other base stations, elements, and/or devices. Each base station 1370a-1370b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1370a-1370b communicate with one or more of the EDs 1310a-1310c over one or more air interfaces 1390 using wireless communication links. The air interfaces 1390 may utilize any suitable radio access technology.

It is contemplated that the system 1300 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 1320a-1320b are in communication with the core network 1330 to provide the EDs 1310a-1310c with voice, data, application, Voice over Internet Protocol (VoIP), or other services. Understandably, the RANs 1320a-1320b and/or the core network 1330 may be in direct or indirect communication with one or more other RANs (not shown). The core network 1330 may also serve as a gateway access for other networks (such as the PSTN 1340, the Internet 1350, and the other networks 1360). In addition, some or all of the EDs 1310a-1310c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1350.

Although FIG. 13 illustrates one example of a communication system, various changes may be made to FIG. 13. For example, the communication system 1300 could include any number of EDs, base stations, networks, or other components in any suitable configuration.

Figure 14A:
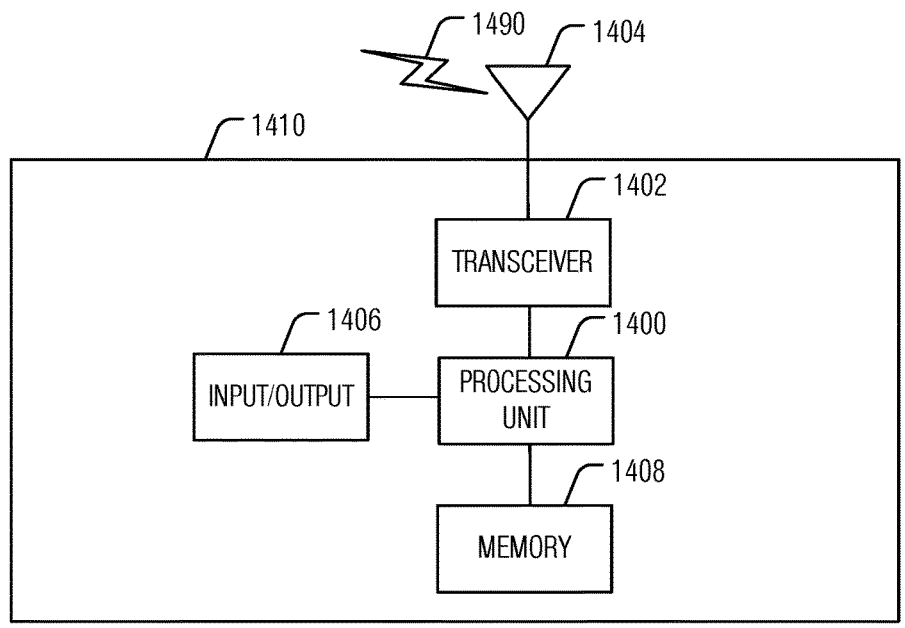
FIGS. 14A and 14B illustrate example devices that may implement the methods and teachings according to this disclosure.
Figure 14B:
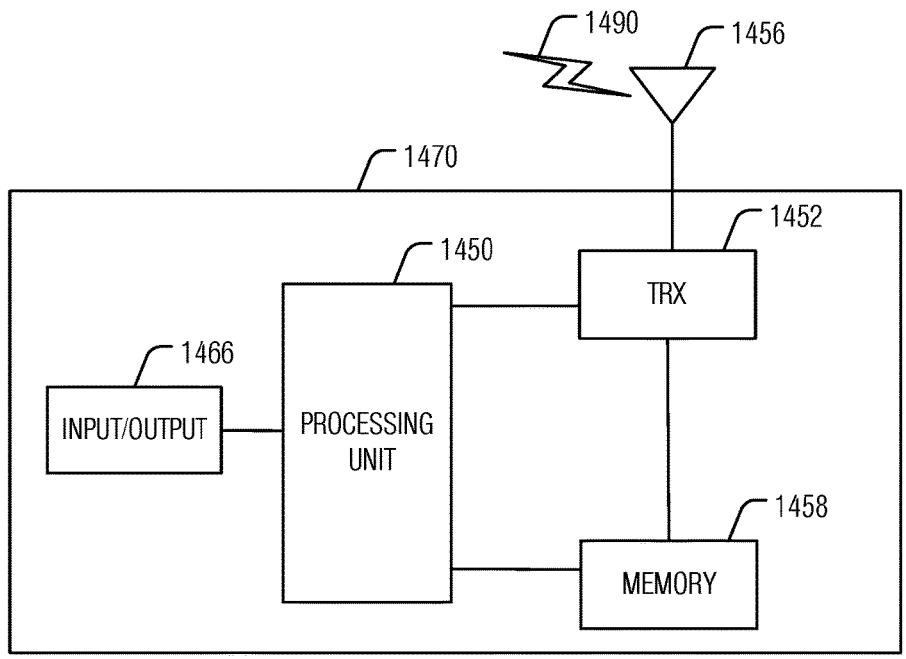

FIGS. 14A and 14B illustrate example devices that may implement the methods and teachings according to this disclosure. In particular, FIG. 14A illustrates an example ED 1410, and FIG. 14B illustrates an example base station 1470. These components could be used in the system 1300 or in any other suitable system.

As shown in FIG. 14A, the ED 1410 includes at least one processing unit 1400. The processing unit 1400 implements various processing operations of the ED 1410. For example, the processing unit 1400 could perform signal coding, data processing, power control, input/output processing, or any other functionality enabling the ED 1410 to operate in the system 1300. The processing unit 1400 also supports the methods and teachings described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1410 also includes at least one transceiver 1402. The transceiver 1402 is configured to modulate data or other content for transmission by at least one antenna or NIC (Network Interface Controller) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the ED 1410, and one or multiple antennas 1404 could be used in the ED 1410. Although shown as a single functional unit, a transceiver 1402 could also be implemented using at least one transmitter and at least one separate receiver.

The ED 1410 further includes one or more input/output devices 1406 or interfaces (such as a wired interface to the Internet 1350). The input/output devices 1406 facilitate interaction with a user or other devices (network communications) in the network. Each input/output device 1406 includes any suitable structure for providing information to or receiving/providing information from a user, such as a speaker, microphone, keypad, keyboard, display, or touch screen, including network interface communications.

In addition, the ED 1410 includes at least one memory 1408. The memory 1408 stores instructions and data used, generated, or collected by the ED 1410. For example, the memory 1408 could store software or firmware instructions executed by the processing unit(s) 1400 and data used to reduce or eliminate interference in incoming signals. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 14B, the base station 1470 includes at least one processing unit 1450, at least one transceiver 1452, which includes functionality for a transmitter and a receiver, one or more antennas 1456, at least one memory 1458, and one or more input/output devices or interfaces 1466. A scheduler, which would be understood by one skilled in the art, is coupled to the processing unit 1450. The scheduler could be included within or operated separately from the base station 1470. The processing unit 1450 implements various processing operations of the base station 1470, such as signal coding, data processing, power control, input/output processing, or any other functionality. The processing unit 1450 can also support the methods and teachings described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transceiver 1452 includes any suitable structure for generating signals for wireless or wired transmission to one or more EDs or other devices. Each transceiver 1452 further includes any suitable structure for processing signals received wirelessly or by wire from one or more EDs or other devices. Although shown combined as a transceiver 1452, a transmitter and a receiver could be separate components. Each antenna 1456 includes any suitable structure for transmitting and/or receiving wireless or wired signals. While a common antenna 1456 is shown here as being coupled to the transceiver 1452, one or more antennas 1456 could be coupled to the transceiver(s) 1452, allowing separate antennas 1456 to be coupled to the transmitter and the receiver if equipped as separate components. Each memory 1458 includes any suitable volatile and/or non-volatile storage and retrieval device(s). Each input/output device 1466 facilitates interaction with a user or other devices (network communications) in the network. Each input/output device 1466 includes any suitable structure for providing information to or receiving/providing information from a user, including network interface communications.

Figure 15:
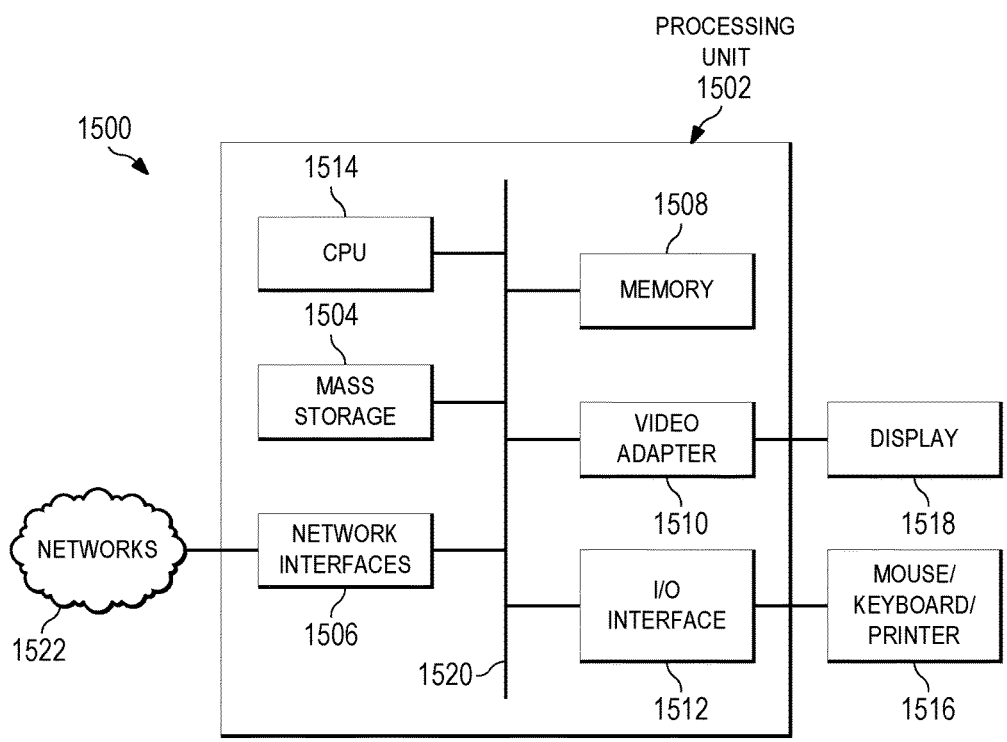
FIG. 15 is a block diagram of a computing system that may be used for implementing the devices and methods disclosed herein.

FIG. 15 is a block diagram of a computing system 1500 that may be used for implementing the devices and methods disclosed herein. For example, the computing system can be any entity of UE, access network (AN), mobility management (MM), session management (SM), user plane gateway (UPGW), and/or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1500 includes a processing unit 1502. The processing unit includes a central processing unit (CPU) 1514, memory 1508, and may further include a mass storage device 1504, a video adapter 1510, and an I/O interface 1512 connected to a bus 1520.

The bus 1520 may be one or more of any type of several bus architectures including a memory bus or memory controller, a peripheral bus, or a video bus. The CPU 1514 may comprise any type of electronic data processor. The memory 1508 may comprise any type of non-transitory system memory such as static random access memory (SRAM), dynamic random access memory (DRAM), synchronous DRAM (SDRAM), read-only memory (ROM), or a combination thereof. In an embodiment, the memory 1508 may include ROM for use at boot-up, and DRAM for program and data storage for use while executing programs.

The mass storage 1504 may comprise any type of non-transitory storage device configured to store data, programs, and other information and to make the data, programs, and other information accessible via the bus 1520. The mass storage 1504 may comprise, for example, one or more of a solid state drive, hard disk drive, a magnetic disk drive, or an optical disk drive.

The video adapter 1510 and the I/O interface 1512 provide interfaces to couple external input and output devices to the processing unit 1502. As illustrated, examples of input and output devices include a display 1518 coupled to the video adapter 1510 and a mouse/keyboard/printer 1516 coupled to the I/O interface 1512. Other devices may be coupled to the processing unit 1502, and additional or fewer interface cards may be utilized. For example, a serial interface such as Universal Serial Bus (USB) (not shown) may be used to provide an interface for an external device.

The processing unit 1502 also includes one or more network interfaces 1506, which may comprise wired links, such as an Ethernet cable, and/or wireless links to access nodes or different networks. The network interfaces 1506 allow the processing unit 1502 to communicate with remote units via the networks. For example, the network interfaces 1506 may provide wireless communication via one or more transmitters/transmit antennas and one or more receivers/receive antennas. In an embodiment, the processing unit 1502 is coupled to a local-area network 1522 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an adding unit/module, an indicating unit/module, a releasing unit/module, a forwarding unit/module, an establishing unit/module, an operating unit/module, an applying unit/module, a processing unit/module, a checking unit/module, and/or a changing unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a first access node in a dual connectivity (DuCo) handover, the method comprising:
    receiving, by the first access node, an event trigger for a combined event from a user equipment (UE), the event trigger reflecting a combination of a first quality indicator associated with the first access node falling below a first threshold and a second quality indicator associated with a second access node rising above a second threshold relative to a third quality indicator associated with the first access node;
    sending, by the first access node, to a second access node, a combined instruction for primary secondary cell (PSCell) addition and a role change with the second access node in accordance with the event trigger;
    adding, by the first access node, the second access node as a PSCell; and
    indicating, by the first access node, to the UE, a role change between the first access node and the second access node.

2. The method of claim 1, further comprising:
    receiving, by the first access node, a UE context release instruction from the second access node; and
    releasing, by the first access node, a UE context associated with the UE.

3. The method of claim 2, further comprising:
    forwarding, by the first access node, at least one data packet to the second access node prior to receiving the UE context release instruction.

4. The method of claim 1, further comprising:
receiving, by the first access node, an acknowledgement for both the PSCell addition and the role change from the second access node.

5. A first access node comprising:
A non-transitory memory storage comprising instructions; and
one or more processors in communication with the non-transitory memory storage, wherein the one or more processors execute the instructions to:
receive an event trigger for a combined event from a user equipment (UE), wherein the event trigger reflects a combination of a first quality indicator associated with the first access node falling below a first threshold and a second quality indicator associated with a second access node rising above a second threshold relative to a third quality indicator associated with the first access node;
send, to a second access node, a combined instruction for primary secondary cell (PSCell) addition and a role change with the second access node in accordance with the event trigger;
add the second access node as a PSCell; and
indicate, to the UE, a role change between the first access node and the second access node.

6. The first access node of claim 5, wherein the one or more processors execute the instructions to:
receive a UE context release instruction from the second access node; and
release a UE context associated with the UE.

7. The first access node of claim 6, wherein the one or more processors execute the instructions to:
forward at least one data packet to the second access node prior to receiving the UE context release instruction.

8. The first access node of claim 5, wherein the one or more processors execute the instructions to:
receive an acknowledgement for both the PSCell addition and the role change from the second access node.

* * * * *